United States Patent
Diachina et al.

(10) Patent No.: US 9,001,654 B2
(45) Date of Patent: *Apr. 7, 2015

(54) ENHANCED MULTIPLEXING FOR SINGLE RLC ENTITY

(75) Inventors: John Diachina, Garner, NC (US);
Andreas Bergström, Vikingstad (SE);
Paul Schliwa-Bertling, Ljungsbro (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 357 days.

This patent is subject to a terminal disclaimer.

(21) Appl. No.: 13/143,313

(22) PCT Filed: Aug. 25, 2010

(86) PCT No.: PCT/IB2010/053826
§ 371 (c)(1),
(2), (4) Date: Aug. 2, 2011

(87) PCT Pub. No.: WO2011/024131
PCT Pub. Date: Mar. 3, 2011

(65) Prior Publication Data
US 2012/0163170 A1    Jun. 28, 2012

(51) Int. Cl.
*H04W 72/12* (2009.01)
*H04L 12/801* (2013.01)
(Continued)

(52) U.S. Cl.
CPC ........... *H04W 72/1242* (2013.01); *H04L 47/10* (2013.01); *H04L 47/14* (2013.01); *H04L 47/245* (2013.01); *H04W 28/065* (2013.01)

(58) Field of Classification Search
CPC ......... H04L 47/10; H04L 47/14; H04L 47/24; H04L 47/245; H04W 72/1242; H04W 28/065
USPC ...................................................... 370/231
See application file for complete search history.

(56) References Cited

U.S. PATENT DOCUMENTS

2003/0179726 A1*  9/2003  Forssell et al. ................ 370/328
2004/0120317 A1*  6/2004  Forssell ......................... 370/394
(Continued)

FOREIGN PATENT DOCUMENTS

EP    0 582 537 A2    2/1994
EP    1 411 690 A1    4/2004
(Continued)

OTHER PUBLICATIONS

"Enhanced Multiplexing for a Single RLC Entity (EMSR)", 3GPP draft; GP-100333, 3rdGeneration Partnership Project (3GPP), Mobile Competence Centre, 650, Route Des Lucioles, F-06921 Sophia-Antipolis Cedex, France, vol. TSG GERAN, No. Berlin; Mar. 1, 2010, Feb. 25, 2010, XP050416673, paragraph [9.1.11] paragraph [10.4.14a]; table 10.4.14a.
(Continued)

*Primary Examiner* — Jason Mattis
*Assistant Examiner* — Stephen J Clawson (57) ABSTRACT

A method and apparatus for interrupting the lower priority packet transmission/reception for higher priority packer transmission reception within the context of a common RLC entity is provided herein. The transmission/reception of lower priority data blocks containing data segments of a first higher layer packet is interrupted to transmit/receive higher priority data blocks containing data segments of a second higher layer packet. After the transmission/reception of a final segment of the second higher layer packet, the transmission/reception of the first higher layer packet is resumed. In some embodiments, a final segment of the second higher layer packet is encapsulated in a final higher priority data block with a remaining data segment of the first higher layer packet. The final higher priority data block further includes a transition indicator to indicate a transition from the second higher layer packet back to the first higher layer packet.

42 Claims, 10 Drawing Sheets (51) Int. Cl.
*H04L 12/851* (2013.01)
*H04W 28/06* (2009.01)

(56) References Cited

U.S. PATENT DOCUMENTS

| | | | |
|---|---|---|---|
| 2006/0109864 A1* | 5/2006 | Oksman | 370/474 |
| 2010/0105390 A1 | 4/2010 | Ishii | |
| 2010/0284338 A1 | 11/2010 | Persson et al. | |

FOREIGN PATENT DOCUMENTS

| | | |
|---|---|---|
| JP | 2001-320417 A | 11/2001 |
| WO | WO 03/034757 A1 | 4/2003 |
| WO | WO 03/081817 A1 | 10/2003 |
| WO | WO 2008/105419 A1 | 9/2008 |
| WO | WO 2010/125457 A1 | 11/2010 |

OTHER PUBLICATIONS

3rd Generation Partnership Project; Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 7), 3GPP standard; 3GPP TS 44.060, Mobile Competence Centre; 650, Route Des Lucioles; F-06921 Sophia-Antipolis Cedex; France, No. V7.17.0, May 1, 2009, pp. 1-565, XP050378743, paragraphs [5.2.], [5.2.2], [5.5.1.9], paragraphs [8.1.1], [9.1.4], [9.1.11], [9.1.12], [10.4.9b], paragraphs [10.4.10], [10.4.12], [10.4.14.a], [10.4.16], table 10.4.14.a.

3GPP TS 44.060 V6.26.0 (Feb. 2009) "3$^{rd}$ Generation Partnership Project; Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 6)", Feb. 2009, the whole document.

"3rd Generation Partnership Project; Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 7)" 3GPP Standard; 3GPP TS 44.060, 3$^{rd}$ Generation Partnership Project (3GPP), Mobile Competence Centre; 650, Route Des Lucioles; F-06921 Sophia-Antipolis Cedex; France, No. V7.16.0, Feb. 1, 2009, pp. 1-567, XP050378742, section 9.

LG Electronics Inc: "UL scheduling for VoiP", 3GPP Draft; R2-062927 Uplink Scheduling VoiP R6, 3$^{rd}$ Generation Partnership Project (3GPP), Mobile Competence Centre; 650, Route Des Lucioles; F-06921 Sophia-Antipolis Cedex; France, vol. Ran WG2, No. Seoul, Korea; Oct. 16, 2006, XP050132445, paragraphs [0001], [0003]; figure 1.

* cited by examiner

ENHANCED MULTIPLEXING FOR SINGLE RLC ENTITY

This application claims the benefit of U.S. Provisional Application Ser. No. 61/237,744 filed 28 Aug. 2009, and U.S. Provisional Application Ser. No. 61/261,118, filed 13 Nov. 2009, both of which are incorporated herein by reference.

TECHNICAL FIELD

The present invention relates generally to radio link control (RLC) protocols for wireless communication networks, and more particularly to methods and apparatuses for interrupting and resuming transmissions on an RLC data block basis for different priority packet flows within a single RLC entity.

BACKGROUND

RLC is a protocol used in wireless communication networks to convey user plane or control plane information between a mobile station and a radio access network. When conveying user plane information, the RLC protocol receives a protocol data unit (PDU) from a higher layer known as the logical link control (LLC) layer, where each LLC PDU is associated with a packet flow context (PFC) and is divided into smaller data packets, referred to herein as RLC data blocks for transmission over the wireless communication channel to a receiver. The receiver reassembles the LLC PDU from the received RLC data blocks.

In some scenarios, the RLC protocol entity operating at a transceiver and a receiver may support the transmission and reception of multiple packet data sessions in parallel, whereby multiple PFCs share a common RLC entity. Each PFC has its own packet data protocol (PDP) context, and therefore has its on quality of service (QoS) attributes from which a transmission priority may be derived. When a common RLC entity supports multiple PFCs, the transmitting RLC entity may receive LLC PDUs corresponding to these PFCs asynchronously and generally decides which PFC to service on a per LLC PDU basis, which requires the RLC entity to complete a transmission of an LLC PDU in progress before beginning the transmission of the next LLC PDU. A higher priority LLC PDU may therefore incur undesirable transmission delays while the common RLC entity completes the transmission of a lower priority LLC PDU. Such delays may cause perceivable degradation of the service supported by the higher priority LLC PDU, especially when the lower priority LLC PDU has a significant length.

SUMMARY

The present invention overcomes the priority-based problems associated with the use of a common RLC entity by providing a method and apparatus for interrupting the transmission/reception of lower priority higher layer packets to transmit/receive higher priority higher layer packets within the context of a common RLC entity. An RLC entity views LLC PDUs as higher layer packets. It will be appreciated that the present invention applies to both the uplink and downlink of a wireless communication network.

According to one exemplary embodiment, lower priority data blocks (also referred to herein as RLC data blocks) containing data segments of a first higher layer packet associated with a lower priority first PFC experience ongoing transmission to a receiver. The transmission of the first higher layer packet is interrupted to transmit higher priority data blocks containing data segments of a second higher layer packet associated with a higher priority second PFC. After the transmission of a final data segment of the second higher layer packet, the transmission of the first higher layer packet is resumed. In one exemplary embodiment, the lower priority data blocks are sequentially numbered before the interruption, and the sequential numbering continues without sequence number restart for the interrupting higher priority data blocks and the resuming lower priority data blocks.

The receiver receives the lower priority data blocks. Upon receipt of the first higher priority data block, the receiver detects an interruption of the first higher layer packet. The interruption of the first higher layer packet continues until a final higher priority data block containing a final data segment of the second higher layer packet is received, after which the reception of the first higher layer packet resumes.

The present invention also provides a method and apparatus that more efficiently bundles data segments associated with different higher layer packets during the transition from the interrupting higher layer packet back to the interrupted higher layer packet. More particularly, a final data segment of a first higher layer packet associated with a higher priority first PFC is encapsulated in a final higher priority data block along with a data segment of a second higher layer packet associated with a lower priority second PFC to complete a transmission of the first higher layer packet and to resume a transmission of the second higher layer packet. The final higher priority data block further includes a transition indicator to indicate a transition within the final higher priority data block from the first higher layer packet back to the second higher layer packet.

The receiver receives the final higher priority data block comprising the final data segment of the first higher layer packet, a remaining data segment of the second higher layer packet, and the transition indicator. The receiver separates the remaining data segment for the second higher layer packet from the final higher priority data block based on the transition indicator to resume a previously interrupted reception of the second higher layer packet.

DETAILED DESCRIPTION

The present invention provides a method and apparatus for interrupting the transmission/reception of a lower priority LLC PDU on a per RLC data block basis to transmit a higher priority LLC PDU within the context of a common RLC entity. The transmission/reception of RLC data blocks containing data segments of to lower priority LLC PDU associated with a lower priority PFC is interrupted to transmit RLC data blocks containing data segments of a higher priority LLC PDU associated with a higher priority PFC. After the transmission/reception of a final data segment of the higher priority LLC PDU within an RLC data block, the transmission/reception of the lower priority LLC PDU resumes, either within the same RLC data block or within a subsequent RLC data block. The interrupting and resuming transitions described herein reduces undesirable transmission delays by using an RLC data block-based transmission granularity to ensure that the relative priorities of the PFCs are honored to the greatest extent possible when multiple PFCs share a common RLC entity. It will be appreciated that the RLC processes described herein may be used by a mobile station on the uplink and/or by a base station on the downlink.

To facilitate the description of the present invention, the following first describes an exemplary mobile communication system based on the Enhanced General Packet Radio Service (EGPRS) standard by the Third Generation Partnership Project (3GPP), and subsequently describes the present invention in the context of an EGPRS mobile communication system. It will be appreciated, however, that the present invention applies to other communication protocols that use a common RLC entity to transmit multiple distinct packet data sessions in parallel. Further, it will be appreciated the present invention applies to both downlink and uplink communications.

Figure 1:
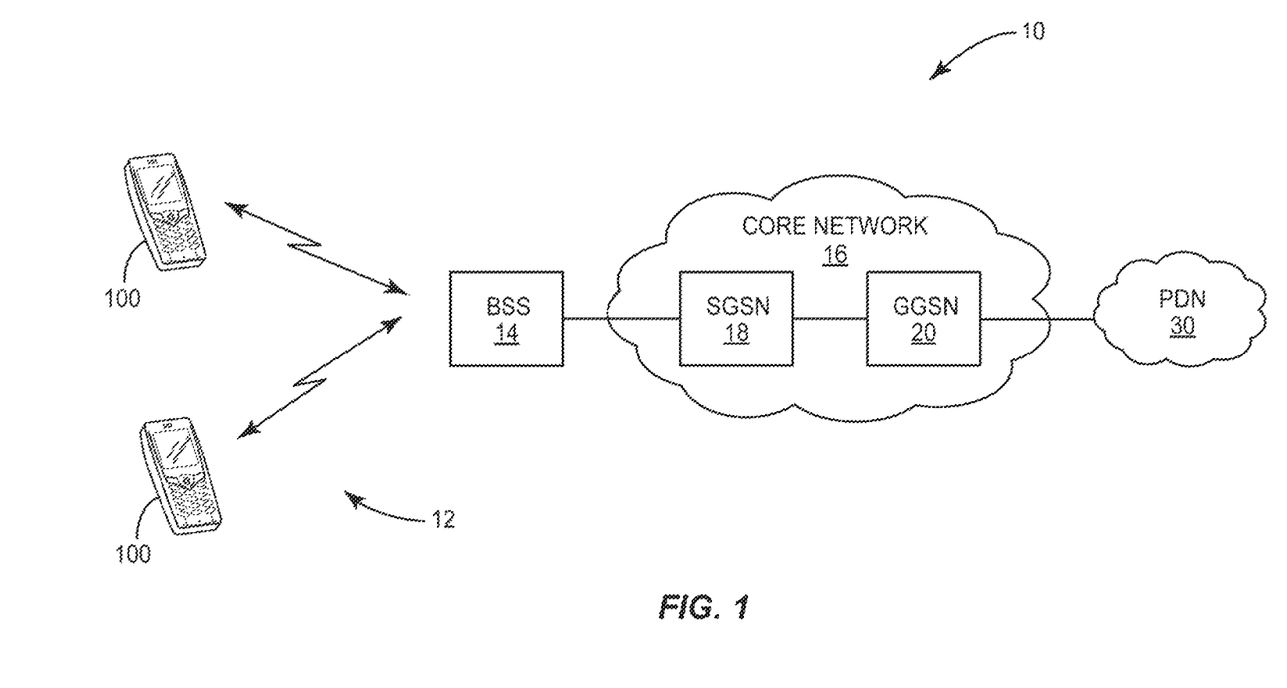
FIG. 1 shows one exemplary mobile communication system providing a connection to an external packet data network.

FIG. 1 shows an exemplary EGPRS network 10 comprising a GSM/EGPRS radio access network (GERAN) 12 and a core network 16. GERAN 12 typically comprises one or more base station subsystems (BSSs) 14. While not explicitly shown, each BSS 14 comprises a base station controller (BSC) and one or more base transceiver stations (BTSs), which may be co-located or in separate locations. The BTSs comprise the antennas, RE equipment, and baseband processing, circuits needed to communicate with mobile terminals 100. The BSC manages the radio resources used for communication with the mobile terminal 100 and provides a connection to the core network 16.

Core network 16 includes one or more serving GPRS support nodes (SGSNs) 18 and one or more gateway GPRS support node (GGSN) 20. The SGSN 18 provides support for packet switched communications, bandies session management and mobility management functions for the packet switched services, and provides a connection to a GGSN 20. The GGSN 20 serves as a gateway between the core network 16 network and external packet data networks 30, e.g., the Internet. For packet data communication, the mobile terminal 100 establishes a communication session with an SGSN 18, and the GGSN 20 connects the SGSN 18 with the external packet data networks 30. A more detailed description of the core network 16 is readily available in the relevant EGPRS standards.

Figure 2:
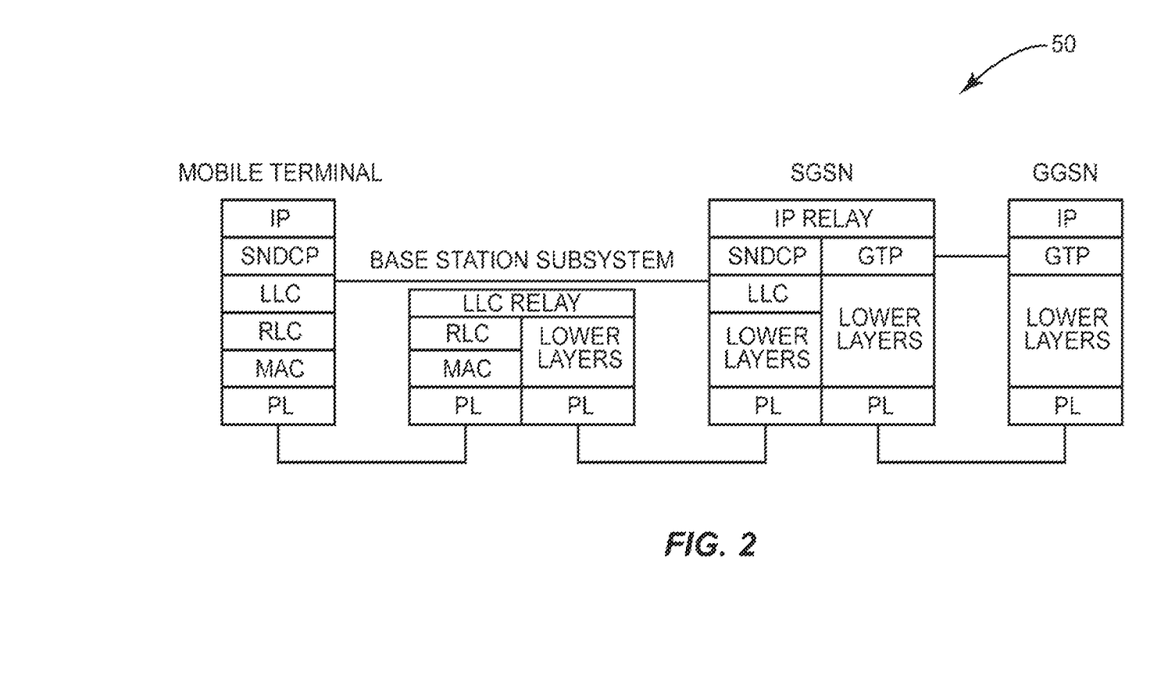
FIG. 2 shows one exemplary protocol stack for a mobile communication system for transmitting data packets between a mobile terminal and an external packet data network.

FIG. 2 provides a simplified illustration of an EGPRS protocol stack. 50 used for transmission of packet data between the mobile terminal 100 and SGSN 18. Protocol stack 50 includes a plurality of protocol layers. The various layers of the protocol stack 50 represent a set of programs and protocols that may be implemented by software running on a host computing device including a processor and memory. Each layer encapsulates data received from a higher layer protocol to generate protocol data units (PDUs) that are passed down to the next lower layer. The term PDU as used herein is synonymous with the term packet.

The SGSN 18 receives IP packets from the GGSN 20. IP packets or other data packets may, for example, be transmitted to the SGSN 18 using the GPRS tunneling protocol (GTP). The protocol stack 50 implemented by the SGSN 18 and mobile terminal 100 includes a Sub Network Dependent Convergence Protocol (SNDCP) layer, Logical Link Control (LLC) layer, Radio Link Control (RLC) layer, Medium Access Control (MAC) layer, and a Physical layer (PL). The SNDCP layer converts the IP packets into a format compatible with the underlying GPRS network architecture. SNDCP PDUs are passed to the LLC layer, which provides a logical connection between the SGSN 18 and mobile terminals 100. The LLC layer encapsulates the SNDCP PDUs with an LLC header to generate LLC PDUs. The Base Station System GPRS Protocol (BSSGP) layer (not shown) routes die LLC PDU to the serving BSS 14 (e.g., over a frame relay PL). The BSSGP operates between the SGSN 18 and the BSS 14, e.g., the BSSGP does not extend over the air interface.

At the BSS 14, an LLC relay provides the LLC PDU to the RLC layer. An RLC entity establishes a reliable link (e.g., if required by the QoS of the corresponding packet switched service) between the BSS 14 and mobile terminal 100. The RLC entity also performs segmentation and reassembly of upper-layer PDUs (LLC PDUs in this example) into RLC packets, which are referred to herein as RLC data blocks. Each RLC data block includes a header and a data field. The header includes a temporary flow identity (TFI) that uniquely maps to a PFC, and the data field includes data segments from the LLC PDU associated with the PFC uniquely identified by the TEL in the corresponding header. The RLC data blocks are passed to the MAC layer which encapsulates the RLC data blocks with MAC headers. The MAC layer controls access signaling across the air interface, including the assignment of uplink and downlink radio blocks which are used to carry the RLC data blocks. The data is then transmitted to a mobile terminal 100 over the air interface via the PL. The PL is responsible for converting data received from the MAC layer into a bit stream suitable for transmission to the mobile terminal 100 over the radio interface.

Figure 3:
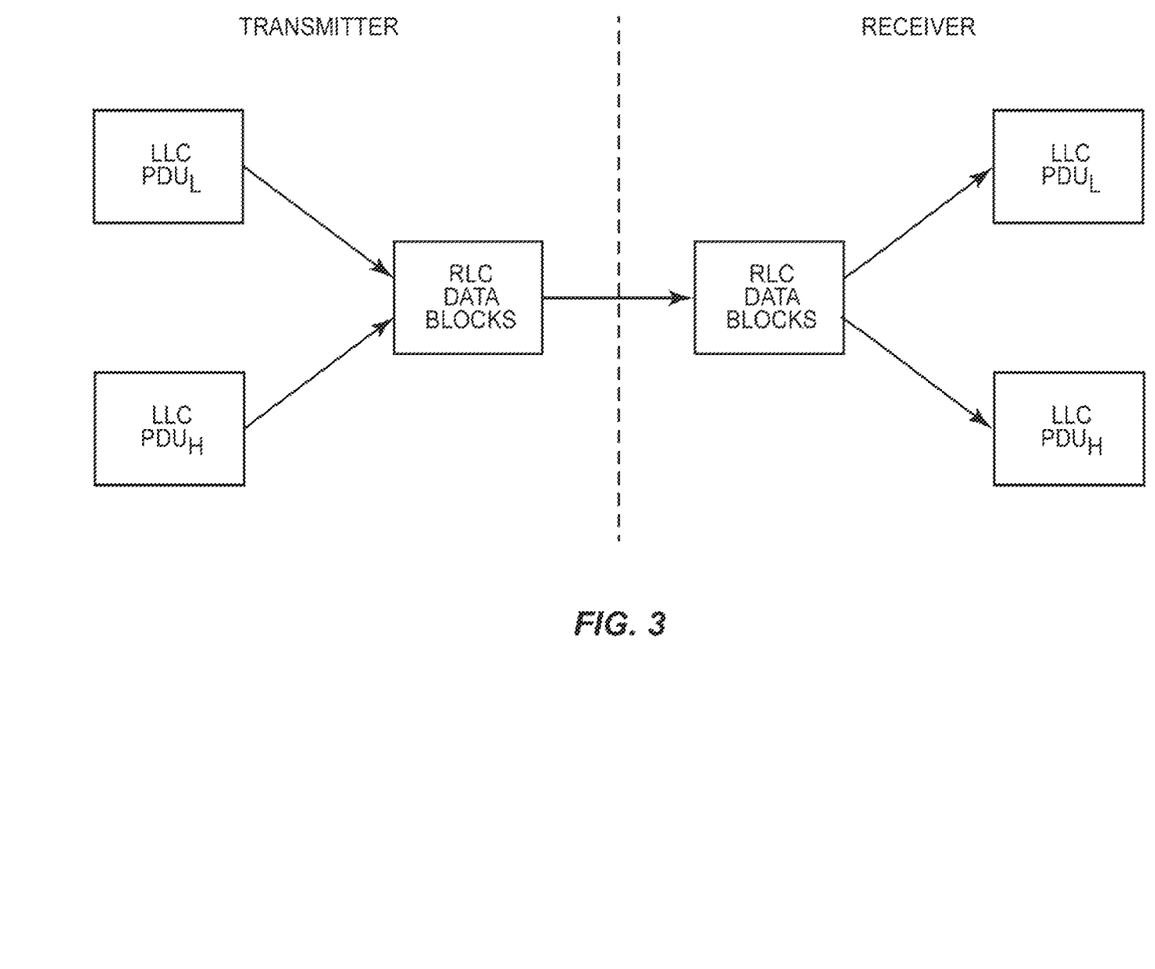
FIG. 3 shows one exemplary simplified block diagram of the relationship between the common RLC entity and the higher layer packets at the transmitter and the receiver.

The RLC layer of the BSS 14 and/or mobile terminal 100 may support the transmission and reception of multiple packet data sessions in parallel, whereby each packet session has a corresponding PFC and multiple PFCs share a common RLC entity. Each LLC PDU is uniquely associated with a distinct PFC, where each PFC has a particular transmission priority and QoS. For example, an LLC PDU associated with a lower priority PFC, e.g., LLC $PDU_L$, may share a common RLC entity with an LLC PDU associated with a higher priority PFC, e.g., LLC, $PDU_H$, as shown in FIG. 3. Conventional systems operate using an LLC PDU-based transmission granularity, and therefore require the RLC entity to complete the transmission/reception of the RLC data blocks associated with a specific LLC PDU before beginning the transmission/reception of the RLC data blocks associated with a different LLC PDU. As a result, the transmission and reception of data for a higher priority LLC PDU ntay be undesirably delayed while the RLC entity completes the transmission/reception of data blocks for a lower priority LLC PDU.

Figure 4:
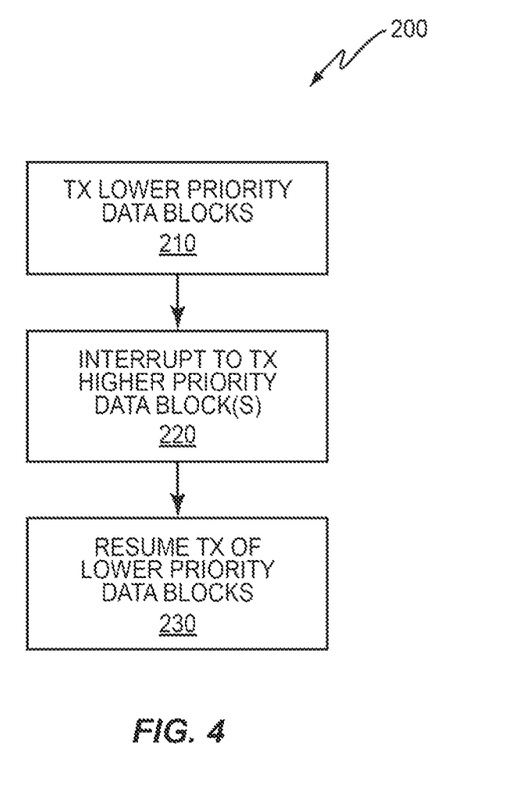
FIG. 4 shows one exemplary transmission method for interrupting and resuming higher layer packet transmissions within the context of a common RLC entity.

The present invention addresses this problem by providing a method and apparatus for interrupting RLC data block transmissions for a lower priority PFC in favor of RLC data block transmission for a higher priority PFC within the context of a single RLC entity. FIG. 4 shows one exemplary method 200 for interrupting and resuming lower priority transmissions. In general, the RLC entity transmits RLC data blocks containing data segments of an LLC PDU associated with the lower priority PFC (LLC $PDU_L$) (block 210), where the lower priority RLC data blocks are sequentially numbered. The RLC entity interrupts the transmission of LLC $PDU_L$ by transmitting one or more RLC data blocks containing, data segments of an LLC PDU associated with the higher priority PFC (LLC $PDU_H$) (block 220). The higher priority RLC data blocks are also sequentially numbered, where the sequential numbering is continued, from the lower priority RLC data blocks without a sequence number restart. After transmitting a final data segment of LLC $PDU_H$ within an RLC data block, the RLC entity resumes the transmission of data segments associated with LLC $PDU_L$, either within the same RLC data block or within a subsequent RLC data block (block 230). The resuming lower priority RLC data blocks are also sequentially numbered, where the sequential numbering is continued from the higher priority RLC data blocks without a sequence number restart.

Figure 5:
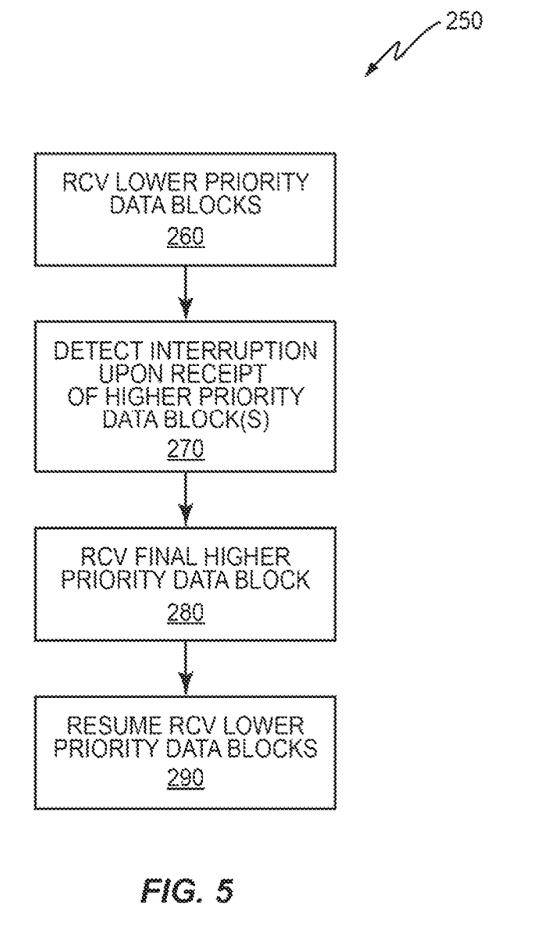
FIG. 5 shows one exemplary reception method for interrupting and resuming higher layer packet receptions within the context of a common RLC entity.

FIG. 5 shows one exemplary interrupting and resuming method 250 from the perspective of the receiver. In general, the RLC entity receives RLC data blocks containing data segments for the LLC $PDU_L$ (block 260), where the lower priority RLC data blocks are sequentially numbered. The RLC entity detects an interruption of the LLC $PDU_L$ upon receiving an RLC data block containing a data segment for the LLC $PDU_H$ (block 270). The higher priority RLC data blocks are also sequentially numbered, where the sequential numbering is continued from the lower priority RLC data blocks without a sequence number restart. After receiving a final data segment of the LLC $PDU_R$ within an RLC data block (block 280), the RLC entity resumes the reception of the data segments of the LLC $PDU_L$ (block 290), which may be contained within the same RLC data block or within a subsequent RLC data block. The resuming lower priority RLC data blocks are also sequentially numbered, where the sequential numbering is continued from the higher priority RLC data blocks without a sequence number restart.

To successfully implement the interrupting and resuming transitions of the present invention, the RLC entity signals the interrupting and/or resuming transitions. The RLC entity may signal the interrupting transition by changing the temporary flow identity (TFI) of the interrupting RLC data block. For example, the RLC entity may change the TFI in the header of the interrupting RLC data blocks from $TFI_L$, which is uniquely associated with the lower priority PFC, to $TFI_H$, which is uniquely associated with the higher priority PFC. Similarly, the RLC entity may signal the resuming transition by including $TFI_L$ in the header of the resuming RLC data blocks. For example, the header of the of the initial and resuming lower priority RLC data blocks may each include $TFI_L$, while the header of the interrupting higher priority RLC data blocks may each include $TFI_H$. It will be appreciated that the data fields of the RLC data blocks contain data segments associated with the PFC identified by the header TFI.

In another embodiment, the RLC entity signals the interrupting transition by including $TFI_H$ in the header of the higher priority RLC data blocks, and includes $TFI_H$ along with a transition indicator in the data field of the first interrupting higher priority RLC data block. By including the transition indicator and $TFI_H$ in the data field of the first interrupting higher priority RLC data block, the receiving RLC entity is able to detect the precise point of interruption within the sequence of received RLC data blocks even if the receiver did not successfully receive the RLC data block immediately previous to the first interrupting higher priority RLC data block. The RLC entity signals the resuming transition by including $TFI_L$ and a transition indicator in the data field of the first resuming RLC data block, and including $TFI_L$ in the header of all resuming lower priority RLC data blocks. By including the transition indicator and TFI in the data field of the first resuming RLC data block, the RLC entity enables the receiver to detect the transition, even if the receiver did not successfully receive the RLC data block immediately previous to the first resuming higher priority RLC data block. The interrupting transition indicator may be the same as or different from the resuming transition indicator. For example, a length indicator (LI) set to 124 or 125 may be used to indicate an interrupting and/or resuming transitions.

Figure 6:
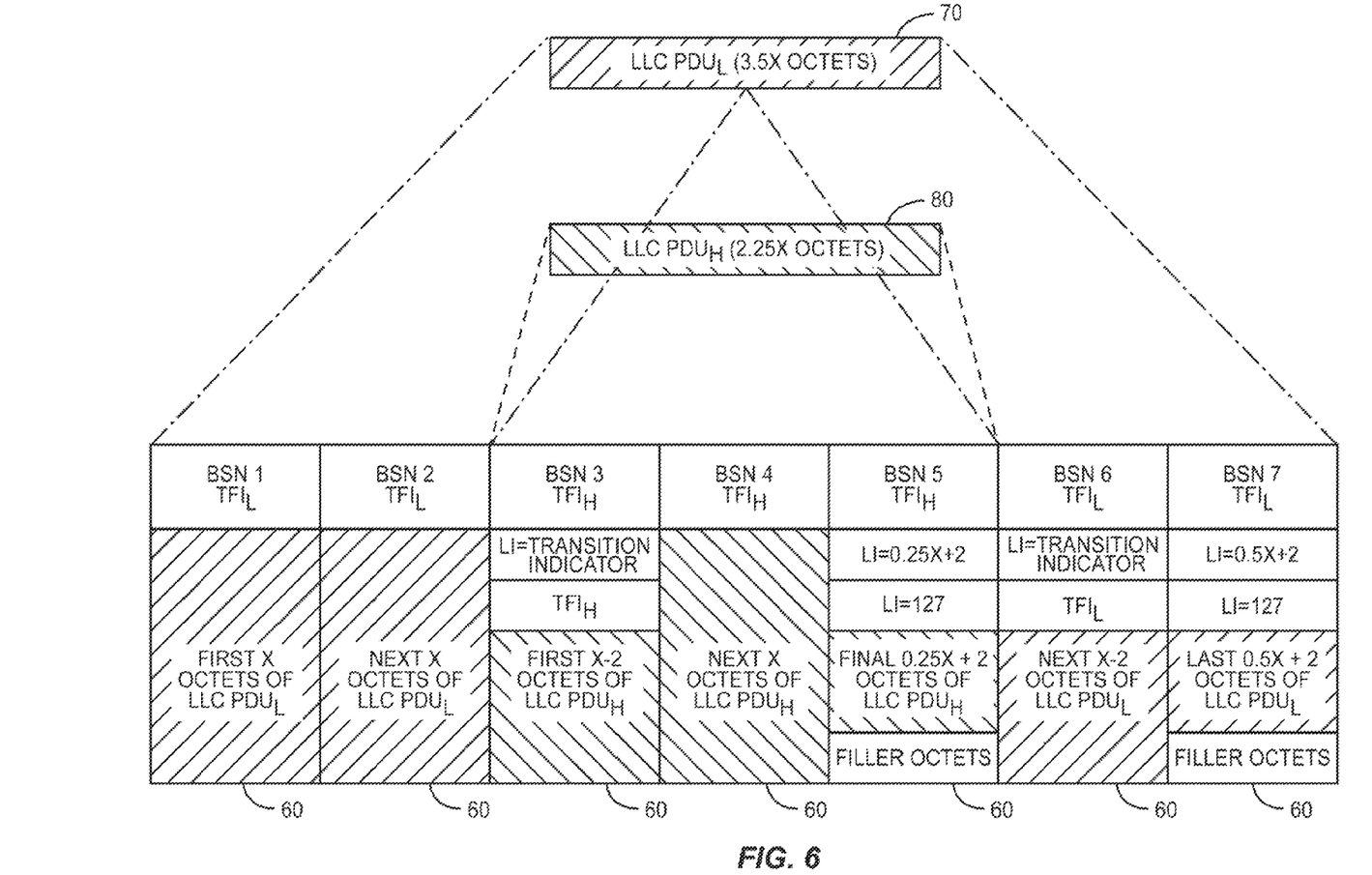
FIG. 6 shows one exemplary scenario for interrupting and resuming higher layer packet transmissions using a common RLC entity.

FIG. 6 shows one example of multiplexed RLC data blocks 60 associated with different priority PFCs 70, 80 within the context of a single RLC entity. The RLC data blocks 60 of FIG. 6 may represent transmission or reception data blocks. While FIG. 6 illustrates the RLC data blocks 60 for the embodiment that includes a transition indicator in the data field, it will be appreciated that the present invention is not limited to this embodiment.

Each RLC data block 60 includes a header and a data field, where each data field may carry up to X octets of data, and where a data segment from an LLC PDU uses one or more consecutive data field octets. In this example, the LLC PDU associated with the lower priority PFC 70 (LLC $PDU_L$) requires 3.5 RLC data blocks 60, while the LLC PDU associated with the higher priority PFC 80 (LLC $PDU_H$) requires 2.25 RLC data blocks 60, resulting in the RLC entity using seven RLC data blocks 60 sequentially numbered with block sequence numbers (BSNs) 1 to 7 for LLC $PDU_L$ and LLC $PDU_H$. The transitions from the lower priority PFC 70 to the higher priority PFC 80 and back to the lower priority PFC 70 do not initiate a BSN sequence number restart. In other words, a single contiguous sequence of BSN values is present in the RLC data blocks 60, even when successive RLC data blocks 60 contain data segments from different PFCs.

The header of each RLC data block 60 includes a TFI that uniquely associates the data segments in the corresponding data field with a specific PFC. For example, $TFI_L$ in the header of BSN 1, BSN 2, BSN 6, and BSN 7 associates the data segments in the corresponding data fields with the lower priority PFC 70. To signal the interrupting transition of the lower priority PFC 70 by the higher priority PFC 80, the RLC entity changes the TFI in the header of the interrupting RLC data blocks 60 to $TFI_H$, and puts data segments for LLC $PDU_H$ in the corresponding data fields. The data field of the first interrupting RLC data block 60, e.g., BSN 3, may also signal the interrupting transition by optionally including $TFI_H$ and a transition length indicator (LI) set to a predetermined transition value, 124 in the first two octets of the data field. As shown in FIG. 6, when the data field includes a transition indicator, the data field has fewer octets available for payload data segments, e.g., two fewer octets in BSN 3 and three fewer octets m BSN 5.

To signal the resuming transition of the lower priority PFC 70, the RLC entity changes the TFI in the header of the resuming RLC data blocks 60 back to $TFI_L$, and puts the remaining data segments of the lower priority LLC PDU in the corresponding data fields. The data field of the first resuming RlX data block 60, e.g., BSN 6, may further signal the resuming transition by including, $TFI_L$ and a transition LI set to a predetermined transition value, e.g., 124, in the first two octets of the data field.

As shown in FIG. 6, the data fields of some RLC data blocks 60, e.g., BSN 5 and BSN 7, may not be completely full with data. For example, the higher priority LLC PDU does not need all of the octets available in BSN 5 to complete the higher priority transmission/reception. In this case, an octet of the data field may identify the number of octets containing data for the last data segment of the higher priority LLC, PDU by including an LI set to a value equal to the number of octets needed to complete the transmission/reception of LLC $PDU_H$, e.g., $LI=0.25\times+2$. An octet of the data field may also optionally be used to include an LI set to a filler value, e.g., 127, to signal that the portion of the data field not filled with octets corresponding to the last data segment of the higher priority LLC PDU contains filler octets (e.g., dummy data).

The above discloses how the RLC entity may interrupt the lower priority PFCs in favor of higher priority PFCs, and therefore, to prevent any undesirable transmission/reception delays. When transitioning from the lower priority PFC to the higher priority PFC, the last RLC data block sent for the lower priority LLC PDU before the interruption will typically not contain the final, data segment of the lower priority LLC PDU and therefore the data field will be full. Thus, there is typically no inefficiency experienced during the transition from the lower priority PFC to the higher priority PFC. However, when transitioning from the higher priority PFC back to the lower priority PFC, the final, higher priority RLC data block may not need all of the available payload space within the data field to complete the transmission/reception of the higher priority LLC PDU, as shown in FIG. 6, which leads to inefficiencies at the RLC layer due to the unused payload space. The following describes how to improve RLC data block packing efficiency for both the uplink and downlink during transitions from higher priority PFCs back to lower priority PFCs within the context of a single RLC entity. More particularly, the following describes how data segments from LLC PDUs corresponding to different PFCs may be encapsulated into a single RLC data block during the transition from the higher priority PFC back to the lower priority PFC to avoid wasting available payload space.

Figure 7:
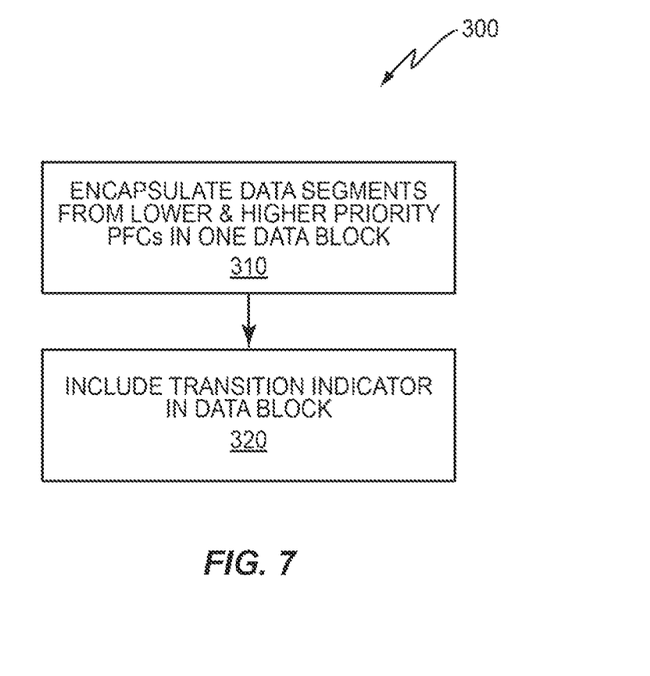
FIG. 7 shows one exemplary method for encapsulating data segments from different higher layer packets for transmission via, a single data block within the context of a common RLC entity.
Figure 8:
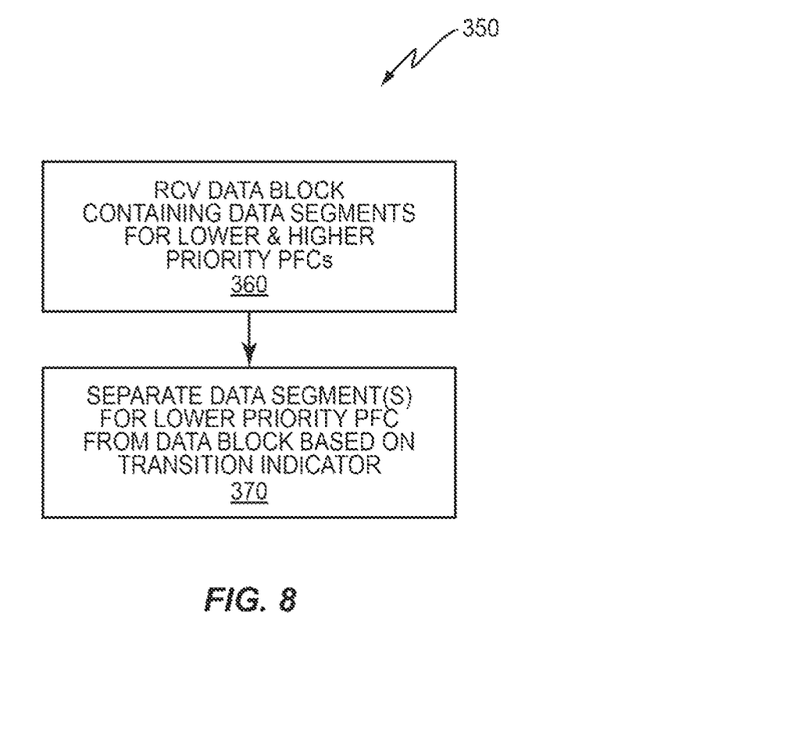
FIG. 8 shows one exemplary method for separating data segments from different higher layer packets received in a single data block within the context of a common RLC entity.

FIGS. 7 and 8 show an encapsulation method 300, 350 for the transmitter and receiver, respectively. At the transmitter, one or more data segments, including die final data segment of a higher priority LLC PDU, is encapsulated along, with one or more remaining data segments of the lower priority LLC PDU associated with a previously interrupted lower priority PFC in the data field of a final higher priority RLC data block (block. 310). The final higher priority RLC data block, further includes a transition indicator to indicate the transition within the final higher priority RLC data block from the higher priority PFC back to the lower priority PFC (block. 320). Upon receipt of the RLC data block containing data segments for both a higher priority PFC and a lower priority PFC (block 360), the RLC entity in the receiver separates the lower priority data segments from the data block based on the number of octets used for the last data segments of the higher priority PFC and a transition indicator included with the data block (block 370). In both the transmission and the reception embodiments, the transition indicator may comprise a transition LI set to a predetermined transition value (e.g., 124 or 125) in the data field of the final higher priority RLC data block. The transition indicator may further comprise a data field TFI that differs from the header TFI, where the header TFI signals the association of a first set of data segments in the data field to the higher priority PFC, and the data field TFI signals the association of a second set of data segments in the data field to the different lower priority PFC.

Figure 9:
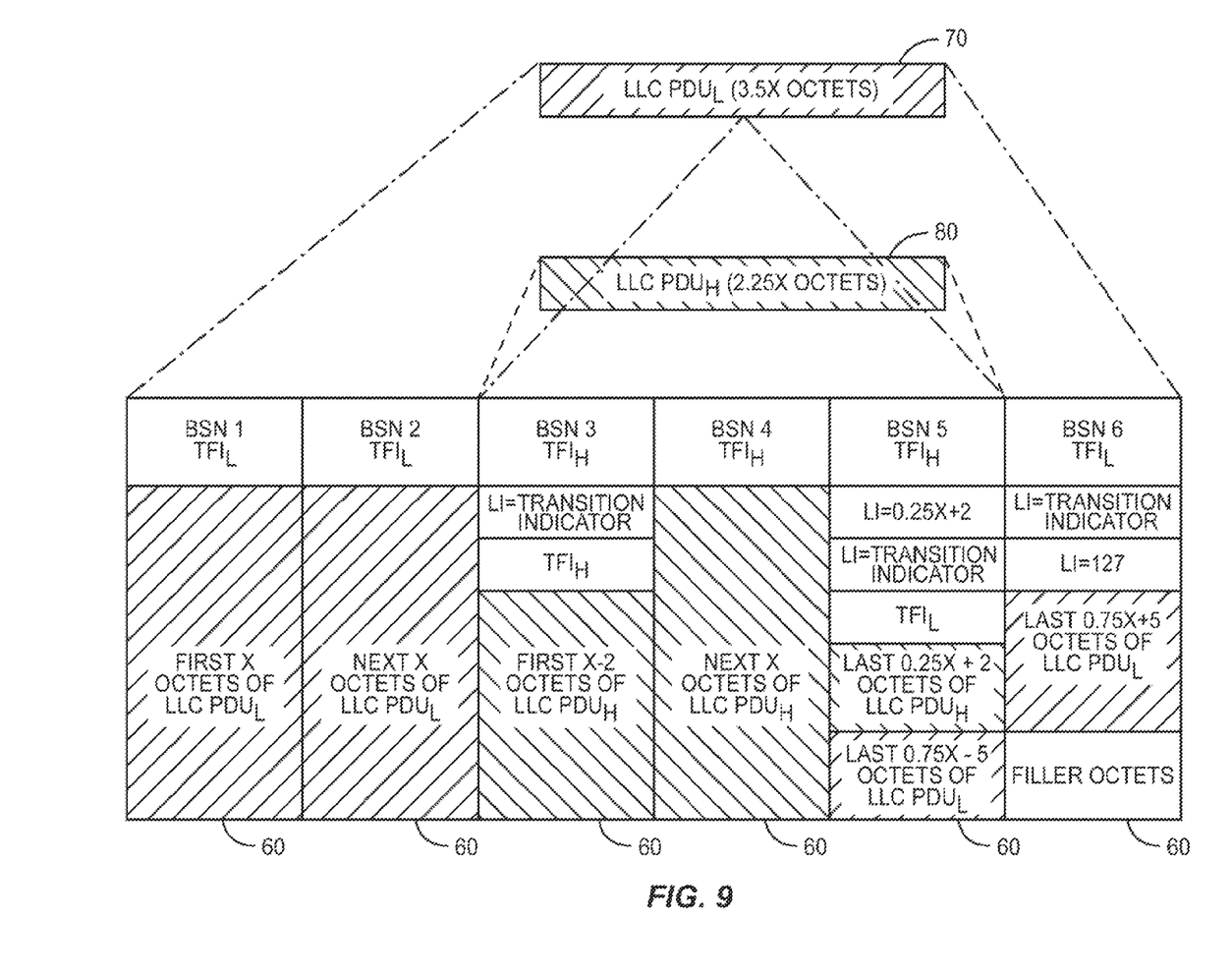
FIG. 9 shows another exemplary scenario for interrupting and resuming packet transmission using a common RLC entity.

FIG. 9 shows one example of multiplexed transmission or reception RLC data blocks associated with different priority PFCs within the context of a single RLC entity, where at least one of the RLC data blocks uses the encapsulation method described above to more efficiently transmit and receive data segments associated with different PFCs during the transition from the higher priority PFC 80 back to the lower priority PFC 70. As with FIG. 6, the lower priority PFC 70 requires 3.5 RLC data blocks, while the higher priority PFC 80 requires 2.25 RLC data blocks. Because of the disclosed encapsulation method, however, the RLC entity for this embodiment only uses six RLC data blocks 60 sequentially numbered with block sequence numbers (BSNs) 1 to 6 for the same lower and higher priority LLC PDUs of FIG. 6. In the example of FIG. 9, RLC data blocks BSN 1 to BSN 4 are identical to that of FIG. 5. Thus, the interruption details provided above are not repeated here.

To more efficiently make the transition from the higher priority PFC back to the lower priority PFC, the RLC entity generates a final higher priority RLC data block 60, BSN 5, that encapsulates both the final higher priority data segment and a remaining lower priority data segment in a single RLC data block 60. The header of BSN 5 includes $THI_H$ to signal that at least a portion of BSN 5 includes payload corresponding to the higher priority PFC. The data field of BSN 5 includes an LI set to a value equal to the number of octets needed to complete the transmission of the final data segment of LLC $PDU_H$, e.g., $LI=0.25\times+2$, a transition LI set to a predetermined transition value, e.g., LI=124, and $TFI_L$. The remainder of the data field includes the last $0.25\times+2$ octets of LLC $PDU_H$, followed by the next $0.75\times-5$ octets of LLC $PDU_L$. BSN 6 completes the transmission of LLC $PDU_L$.

As shown in FIG. 9, the data field of some of the RLC data blocks 60, e.g., BSN 6, may not be completely full. For example, the LLC $PDU_L$ does not need all of the octets available in BSN 6 to complete the lower priority transmission/ reception. In this case, the data field of BSN 6 may optionally include an additional LI set to a filler value, e.g., LI=127 to signal that the portion of the data field not filled with data corresponding, to the last data segment of the lower priority LLC PDU contains filler octets (e.g., dummy data). It will further be appreciated that if BSN 5 includes more octets than needed to complete the transmission of the LLC $PDU_H$ and LLC $PDU_L$, BSN 5 may also include additional LI values, e.g., an LI set to a value equal to the number of octets needed to complete the transmission of the LLC $PDU_L$, and an LI set to a filler value, e.g., LI=127.

Figure 10:
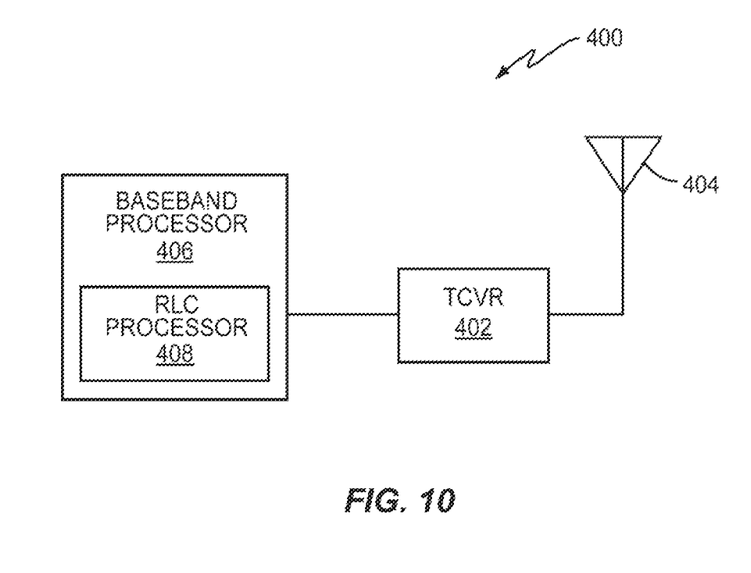
FIG. 10 shows a block diagram of a transmitter and receiver according to one exemplary embodiment of the present invention.

FIG. 10 illustrates an exemplary communication terminal 400 for implementing the interrupting and resuming transitions within the context of a single RLC entity as described herein. Communication terminal 400 may represent a receiver or a transmitter, and may comprise a mobile terminal 100 or base station 14. The communication terminal 400 includes a transceiver 402 coupled to an antenna 403 for transmitting and receiving signals. Baseband processor 406 processes signals transmitted to, and received by; the communication terminal 400. Exemplary processing, performed by baseband processor 406 includes modulation/demodulation, interleaving/de-interleaving, coding/decoding, etc. The baseband processor 406 includes an RLC processor 408 for implementing RLC protocols as described herein. As described above, RLC processor 408 performs the interrupting and resuming transitions of the lower and higher priority data within the context of a single RLC entity. When the RLC entity resumes lower priority transmissions, the RLC processor 408 may be configured to encapsulate the final higher priority data segment(s) along with one or more remaining lower priority data segments in a single RLC data block.

The present invention is described in terms of a single interruption of a lower priority PFC in favor of a higher priority PFC within the context of a common RLC entity. It will be appreciated, however, that any number of interrupting transitions may occur. For example, the transmission/reception of as first lower priority PFC may be interrupted multiple times to enable the transmission/reception of LLC PDUs associated with multiple higher priority PFCs. Further, the interrupting transitions may be stacked such that two or more interrupting transitions occur before the transmission/reception of a lower priority LLC PDU is resumed. For example, the transmission/reception of a lower priority LLC PDU (PDU-A) may be interrupted to transmit/receive a higher priority LLC PDU (PDU-B). The transmission/reception of PDU-B may in turn be interrupted to transmit/receive an even higher priority LLC PDU (PDU-C). It will also be appreciated that a final higher priority RLC data block may include data segments from LLC PDUs associated with more than two PFCs. For example, a final higher priority RLC data block may include the final data segment(s) of PDU-C, the final data segment(s) of PDU-B, and one or more remaining data segments of PDU-A.

The present invention may, of course, be carried, out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A method of transmitting data packets from a transmitter to a receiver within the context of a single radio link control (RLC) entity, the method comprising:
    transmitting lower priority data blocks containing data segments of a first higher layer packet associated with a lower priority first packet flow context (PFC) uniquely identified by a first temporary flow identifier (TFI);
    interrupting the transmission of said first higher layer packet before transmission is complete;
    transmitting higher priority data blocks containing data segments of a second higher layer packet associated with a higher priority second PFC;
    indicating the interruption by including a second TFI uniquely associated with the second PFC in an initial one of the higher priority data blocks; and
    resuming the transmission of said first higher layer packet from the point of interruption of the transmission of the first higher layer packet after transmission of a final data segment of said second higher layer packet.

2. The method of claim 1 comprising sequentially numbering the lower priority data blocks transmitted before interruption, continuing the sequential numbering without sequence number restart when transmitting the higher priority data blocks, and continuing the sequential numbering without sequence number restart when resuming the transmission of the lower priority data blocks.

3. The method of claim 1 wherein the higher layer packets comprise logical link control (LLC) protocol data units (PDUs) associated with an LLC layer and formatted according to an LLC protocol, wherein the data blocks comprise RLC data blocks associated with an RLC layer and formatted according to an RLC protocol.

4. The method of claim 1 wherein the initial one of the higher priority data blocks includes a header containing the second TFI to indicate the interruption.

5. The method of claim 1 wherein the initial one of the higher priority data blocks includes a data field containing the second TFI or a transition indicator set to a predetermined length indicator (LI) value to indicate the interruption.

6. The method of claim 5 wherein the initial one of the higher priority data blocks further includes a header containing the second TFI to indicate the interruption.

7. The method of claim 1 further comprising indicating that transmission of the first higher layer packet is resumed by including the first TFI in an initial one of the remaining lower priority data blocks.

8. The method of claim 1 further comprising transmitting a remaining data segment of the first higher layer packet with a final data segment of the second higher layer packet in a single data block to resume transmission of the first higher layer packet.

9. The method of claim 8 wherein the single data block includes a data field containing the first TFI or a transition indicator set to a predetermined length indicator value to indicate that transmission of the first higher layer packet has been resumed.

10. The method of claim 1 wherein a final higher priority data block includes a data field containing a filler indicator to indicate that an unused portion of the final higher priority data block contains filler data.

11. A communication terminal for transmitting data to a receiver within the context of a single radio link control (RLC) entity, the communication terminal comprising:
    a transceiver for transmitting data blocks to a receiver over a wireless communication channel; and
    a processor to generate the data blocks for transmission over the wireless communication channel, the processor configured to:
        transmit lower priority data blocks containing data segments of a first higher layer packet associated with a lower priority first packet flow context (PFC), each of said lower priority data blocks including a first temporary flow identifier (TFI) uniquely associated with the first PFC;
        interrupt the transmission of said first higher layer packet before transmission is complete;
        transmit higher priority data blocks containing data segments of a second higher layer packet associated with a higher priority second PFC;
        indicate the interruption by including a second TFI uniquely associated with the second PFC in an initial one of the higher priority data blocks; and
        resume the transmission of said first higher layer packet from the point of interruption of the transmission of the first higher layer packet after transmission of a final data segment of said second higher layer packet.

12. The communication terminal of claim 11 wherein the processor is further configured to sequentially number the lower priority data blocks transmitted before interruption, continue the sequential numbering without sequence number restart when transmitting the higher priority data blocks, and continue the sequential numbering without sequence number restart when resuming the transmission of the lower priority data blocks.

13. The communication terminal of claim 11 wherein the higher layer packets comprise logical link control (LLC) protocol data units (PDUs) associated with an LLC layer and formatted according to an LLC protocol, wherein the data blocks comprise RLC data blocks associated with an RLC layer and formatted according to an RLC protocol.

14. The communication terminal of claim 11 wherein the initial one of the higher priority data blocks includes a header, and wherein the processor is further configured to include the second TFI in said header to indicate the interruption.

15. The communication terminal of claim 11 wherein the initial one of the higher priority data blocks includes a data field, and wherein the processor is further configured to include the second TFI or a transition indicator set to a predetermined length indicator (LI) value in said data field to indicate said interruption.

16. The communication terminal of claim 15 wherein the initial one of the higher priority data blocks includes a header, and wherein the processor is further configured to include the second TFI in said header to indicate the interruption.

17. The communication terminal of claim 11 wherein the processor is further configured to indicate that transmission of the first higher layer packet is resumed by including the first TFI in an initial one of the remaining lower priority data blocks.

18. The communication terminal of claim 11 wherein the processor is further configured to transmit a remaining data segment of the first higher layer packet with a final data segment of the second higher layer packet in a single data block to resume transmission of the first higher layer packet.

19. The communication terminal of claim 18 wherein the single data block includes a data field, and wherein the processor is further configured to include the first TFI in the data field or a transition indicator set to a predetermined length indicator value to indicate that transmission of the first higher layer packet has been resumed.

20. The communication terminal of claim 11 wherein a final higher priority data block includes a data field, and wherein the processor is further configured to include a filler indicator in the data field to indicate that an unused portion of the final higher priority data block contains filler data.

21. The communication terminal of claim 11 wherein the communication terminal comprises a mobile device and the receiver comprises a base station.

22. A method of receiving data at a receiver from a transmitter within the context of a single radio link control (RLC) entity, the method comprising:
   receiving lower priority data blocks containing data segments of a first higher layer packet associated with a lower priority first packet flow context (PFC) uniquely identified by a first temporary flow identifier (TFI);
   detecting an interruption of said first higher layer packet upon receipt of an initial one of higher priority data blocks containing a data segment of a second higher layer packet associated with a higher priority second PFC, wherein the initial one of the higher priority data blocks includes a second TFI uniquely associated with the second PFC to enable detection of the interruption;
   receiving a final higher priority data block containing a final data segment of the second higher layer packet; and
   resuming the reception of said first higher layer packet from the point of interruption of the reception of the first higher layer packet after reception of said final data segment of said second higher layer packet.

23. The method of claim 22 wherein receiving the lower and higher priority data blocks comprises receiving sequentially numbered lower and higher priority data blocks, where the sequential numbering starts with an initial lower priority data block containing an initial data segment of the first higher layer packet, and continues without sequence number restart through the higher priority data blocks to the final higher priority data block, and further continues without sequence number restart through the subsequent lower priority data blocks.

24. The method of claim 22 wherein the higher layer packets comprise logical link control (LLC) protocol data units (PDUs) associated with an LLC layer and formatted according to an LLC protocol, wherein the lower layer blocks comprise RLC data blocks associated with an RLC layer and formatted according to an RLC protocol.

25. The method of claim 22 wherein the initial one of the higher priority data blocks includes a header containing the second TFI to indicate the interruption.

26. The method of claim 22 wherein the initial one of the higher priority data blocks includes a data field containing the second TFI or a transition indicator set to a predetermined length indicator (LI) value to indicate the interruption.

27. The method of claim 26 wherein the initial one of the higher priority data blocks further includes a header containing the second TFI to indicate the interruption.

28. The method of claim 22 further comprising detecting that transmission of the first higher layer packet is resumed by detecting the first TFI in an initial one of the remaining lower priority data blocks.

29. The method of claim 22 further comprising receiving a remaining data segment of the first higher layer packet with a final data segment of the second higher layer packet in a single data block when reception of the first higher layer packet is resumed.

30. The method of claim 29 wherein the single data block includes a data field containing the first TFI or a transition indicator set to a predetermined length indicator value to indicate that transmission of the first higher layer packet has been resumed.

31. The method of claim 22 wherein the final higher priority data block further comprises a filler indicator to indicate that an unused portion of the final higher priority data block contains filler data.

32. A communication terminal for receiving data packets from a transmitter within the context of a single radio link control (RLC) entity, the communication terminal comprising:
   a transceiver for receiving data transmitted by the transmitter over a wireless communication channel; and
   a processor configured to reassemble data segments of a first higher layer packet associated with a lower priority first packet flow context (PFC) uniquely identified by a first temporary flow identity (TFI) and data segments of a second higher layer packet associated with a higher priority second PFC uniquely identified by a second TFI, the processor being configured to:
      process lower priority data blocks containing the data segments of the first higher layer packet;
      interrupt the processing of said lower priority data blocks to process higher priority data blocks containing the data segments of the second higher layer packet upon receipt of an initial one of the higher priority data blocks containing the second TFI;
      process one or more additional higher priority data blocks including a final higher priority data block containing a final data segment of the second higher layer packet; and
      resume the processing of the lower priority data blocks from the point of interruption of the processing of the lower priority data blocks after processing the final data segment of the second higher layer packet.

33. The communication terminal of claim 32 wherein the lower and higher priority data blocks are sequentially numbered such that the sequential numbering starts with an initial lower priority data block containing an initial data segment of the first higher layer packet, and continues without sequence number restart through the final higher priority data block, and further continues without sequence number restart through the final lower priority data block.

34. The communication terminal of claim 32 wherein the higher layer packets comprise logical link control (LLC) protocol data units (PDUs) associated with an LLC layer and formatted according to an LLC protocol, wherein the lower layer blocks comprise RLC data blocks associated with an RLC layer and formatted according to an RLC protocol.

35. The communication terminal of claim 32 wherein the initial one of the higher priority data blocks includes a header, and wherein the processor is further configured to detect interruption by detecting the second TFI in said header.

36. The communication terminal of claim 32 wherein the initial one of the higher priority data blocks includes a data field, and wherein the processor is configured to detect interruption by detecting the second TFI or a transition indicator set to a predetermined length indicator (LI) value in the data field.

37. The communication terminal of claim 36 wherein the initial one of the higher priority data blocks further comprises a header, and wherein the processor is further configured to detect interruption by detecting the second TFI in the header.

38. The communication terminal of claim 32 wherein the processor is configured to detect that transmission of the first higher layer packet is resumed by detecting the first TFI in an initial one of the remaining lower priority data blocks.

39. The communication terminal of claim 32 wherein the processor is configured to receive a remaining data segment of the first higher layer packet with a final data segment of the second higher layer packet in a single data block when processing of the first higher layer packet is resumed.

40. The communication terminal of claim 39 wherein the single data block includes a data field containing the first TFI or a transition indicator set to a predetermined length indicator value to indicate that transmission of the first higher layer packet has been resumed.

41. The communication terminal of claim 32 wherein the final higher priority data block further comprises a filler indicator to indicate that an unused portion of the final higher priority data block contains filler data.

42. The communication terminal of claim 32 wherein the communication terminal comprises a base station and the transmitter comprises a mobile terminal.

* * * * *